United States Patent
Greenwood et al.

(10) Patent No.: US 6,791,285 B2
(45) Date of Patent: Sep. 14, 2004

(54) LAMP COLOR CONTROL FOR DIMMED HIGH INTENSITY DISCHARGE LAMPS

(76) Inventors: Simon Richard Greenwood, Brookdale Cottage, Chelford Road, Henbury Macclesfield, Cheshire, SK10 3LH (GB); Stephen Soar, 19 Wroxham Close, Bury, Lancashire, BL8 1EN (GB)

( * ) Notice: Subject to any disclaimer, the term of this patent is extended or adjusted under 35 U.S.C. 154(b) by 0 days.

(21) Appl. No.: 10/292,858

(22) Filed: Nov. 12, 2002

(65) Prior Publication Data
US 2004/0090192 A1 May 13, 2004

(51) Int. Cl.⁷ .............................. H05B 37/02
(52) U.S. Cl. .................. 315/307; 315/224; 315/308
(58) Field of Search ............... 315/307, 308, 315/224, DIG. 7

(56) References Cited

U.S. PATENT DOCUMENTS

| | | | |
|---|---|---|---|
| 5,408,162 A | * | 4/1995 | Williams ............... 315/224 |
| 5,483,126 A | | 1/1996 | Boenigk et al. |
| 6,078,147 A | | 6/2000 | Arts et al. |
| 6,441,564 B1 | | 8/2002 | Gu et al. |

FOREIGN PATENT DOCUMENTS

| | | |
|---|---|---|
| DE | 3636901 A1 | 5/1988 |
| EP | 0 334 356 A1 | 3/1989 |
| EP | 0 439 863 A1 | 12/1990 |
| EP | 0 439 864 A1 | 12/1990 |
| EP | 0439861 A1 | 8/1991 |
| EP | 0596741 A2 | 5/1994 |
| JP | 3-156897 | 11/1989 |

* cited by examiner

Primary Examiner—David Vu
(74) Attorney, Agent, or Firm—Brinks Hofer Gilson & Lione

(57) ABSTRACT

A means of effecting color change or improved color rendition by altering the ratios of average lamp arc current to RMS lamp arc current in a high intensity discharge lamp typically a metal halide lamp operating at less than nominal lower rating.

15 Claims, 4 Drawing Sheets

LAMP COLOR CONTROL FOR DIMMED HIGH INTENSITY DISCHARGE LAMPS

TECHNICAL FIELD

This invention relates to an apparatus and method for improving the colour spectrum of the light emitted from a high intensity discharge (HID) lamp when operating under less than nominal power conditions (i.e. when dimmed). The invention is particularly, though not exclusively, suited to the ballasting of metal halide discharge lamps. Typically such systems can be used for highway lighting, architectural floodlighting, warehouse, retail display and industrial lighting.

BACKGROUND ART

Traditionally, ballasting for HID lamps is by use of inductors or chokes capable of controlling the lamp current through the impedance they present in series with the mains supply voltage. With some types of HID lamp a high striking voltage, typically 4–5 kV, is required to ionize the gas filling the tube and to initiate the arc.

In prior art systems for ballasting HID lamps, the lamp ballasting means and the lamp striking means are typically discrete circuit elements. Historically, HID lamps have been ballasted by using the impedance of a series connected inductor for controlling the lamp current and a separate starter or igniter module to provide the necessary high voltage to strike the lamp.

More recently electronic ballasting means have been devised. Referring to FIGS. 1 and 2, a conventional power factor controller 2 is formed by transistor TR1, inductor L1, diode D1 and capacitor C1. Alternating positive and negative output voltage is provided to the lamp by a full bridge arrangement of a lamp bridge 4 comprising four transistors TR3,TR4,TR5,TR6. The transistors are alternately switched on and off in complementary pairs TR3,TR6 and TR4,TR5 at a low frequency, typically 100–200 Hz.

Connected in series with the lamp across the bridge is an igniter circuit 5 comprising pulse transformer TX1, a Sidac, capacitor C3 and resistor R1. When the igniter circuit operates, the capacitor C3 charges through resistor R1 to a voltage at which the Sidac device switches on, discharging the capacitor C3 into the primary winding of the transformer TX1. The voltage applied to the transformer primary is multiplied by the high turns ratio of the transformer and is sufficient to ionize the gas filling the lamp's arc tube, thereby initiating an arc.

Since the voltage is AC, the arc will be extinguished when the lamp current approaches zero and the voltage applied to the tube is subsequently reversed. Therefore the igniter must operate again in the opposite voltage half cycle to re-strike the arc for the flow of current in the opposite direction. This ignition cycle is repeated until the lamp electrodes are sufficiently heated by the arc current for thermionic emission to take place. Then the arc voltage in the tube falls below the threshold voltage of the Sidac and arc current is maintained without operation of the igniter circuit.

A further transistor TR2 of a current source 3 controls the flow of current in the output bridge circuit and consequently controls the lamp current. Transistor TR2 is turned on until the current in inductor L2 reaches a preset threshold value, then the transistor TR2 is turned off. Current continues to flow via a diode D2 until the current has decayed to another preset threshold value, then the transistor TR2 is turned on again. Typically this controlled current is further controlled by a lamp power control circuit 6 which takes account of lamp arc voltage and sets the lamp current accordingly so as to maintain the lamp power (watts) at a near constant value over a range of lamp arc voltages.

Thus the lamp current is substantially square wave with a small amount of high frequency ripple current superimposed, caused by the switching of TR2 and the consequent high frequency current modulation caused thereby. FIG. 3 illustrates schematically a typical lamp current waveform in accordance with the above prior art, with the lamp operating at nominal power.

Recently electronic ballasts for metal halide lamps were introduced with the capability for dimming the lamp to approximately half power. This was done by reducing the square wave lamp current amplitude (under the control of a lamp power control circuit 6) so as to reduce the lamp power to a desired value. Such means whilst effective in controlling the lamp power and consequent light output to a desired reduced value are deficient in maintaining desirable colour rendition from the lamp. This is due to the lamp operating at reduced temperature and some of the various elements used in the filling (Dose) of the lamp arc tube condensing out in the arc tube. Typically the operation of a metal halide discharge lamp at reduced power results in a relative reduction in light output near the red end of the colour spectrum and a relative increase in the light output at the blue/green end of the colour spectrum. Such colour shift may be acceptable in some lighting applications but is not acceptable in particular in retail display lighting applications and other applications where the perceived colour in the lit area is important to sales or safety. FIG. 4 illustrates a typical lamp current waveform in accordance with the prior art with the lamp operating at a dimmed or reduced power.

SUMMARY

The invention provides a circuit for improving the light spectrum emitted from a dimmed high intensity discharge lamp by superimposing a high frequency waveform onto a substantially square wave lamp current derived from a high intensity discharge lamp ballast, characterized in that the frequency and mark to space ratio of the high frequency waveform are such that for each half cycle of a resultant waveform, the magnitude of a RMS lamp current is greater than the magnitude of an average lamp current.

The invention further provides a method for improving the light spectrum emitted from a dimmed high intensity discharge lamp wherein a high frequency waveform is superimposed on a substantially square wave lamp current derived from a high intensity discharge lamp ballast, characterized in that the frequency and mark to space ratio of the high frequency waveform are such that for each half cycle of a resultant waveform, the magnitude of a RMS lamp current is greater than the magnitude of an average lamp current.

Within both aspects of the invention, the modulation of lamp arc current increases the RMS value of the lamp arc current whilst maintaining an average lamp arc current commensurate with dimmed or reduced power operation. Substantially the average value of light output from a typical metal halide lamp or other high intensity discharge lamp is controlled by the average current whilst, substantially the operating temperature of a typical metal halide lamp or other high intensity discharge lamp arc tube and contents thereof is controlled by the RMS arc current. Thus by increasing the RMS content of the lamp arc current whilst maintaining the average current at a value commensurate with dimmed operation an increase in arc tube and contents thereof operating temperature may be affected. This increased operating temperature of the arc tube and contents keeps the dose elements in the gaseous state and improves the colour rendering of the lamp nearer to that which is expected of a lamp operating at nominal power.

BRIEF DESCRIPTION OF THE DRAWINGS

By way of example only, a preferred embodiment of the present invention will be described in detail with reference to the accompanying drawings in which.

DETAILED DESCRIPTION OF THE EMBODIMENTS

Figure 5:
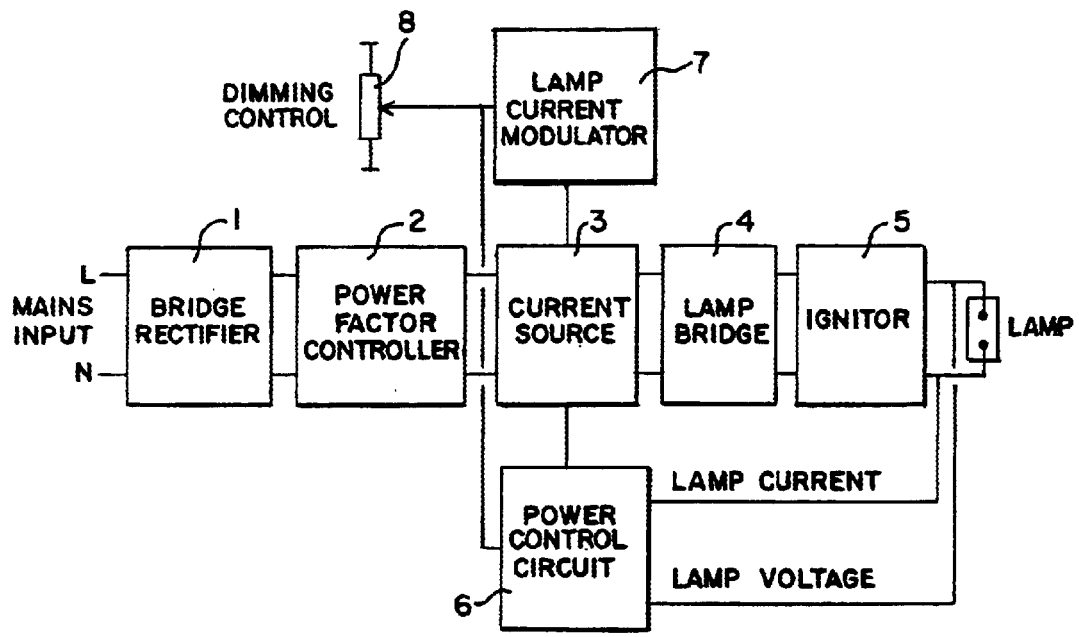
FIG. 5 illustrates a lamp ballast block diagram according to a preferred embodiment of the invention.
Figure 6:
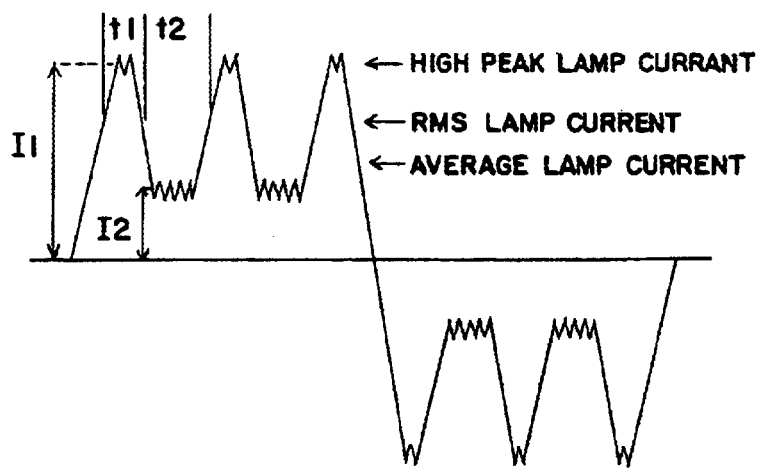
FIG. 6 illustrates a typical lamp current waveform produced by the lamp ballast of FIG. 5 with the lamp operating at a dimmed or reduced power (the rise and fall times of the waveform have been exaggerated for clarity).

Referring to FIGS. 5 and 6 which represent a lamp ballast operating according to the invention, the square wave fundamental operating frequency lamp current waveform is modulated in this case by a higher frequency square wave. By altering the amplitude and mark to space ratio of this modulating waveform it is possible to alter the RMS current content of the overall lamp arc current waveform relative to the average current value of the lamp arc current waveform. In this way the operating temperature of the lamp's arc tube and its contents may be controlled in accordance with the invention. The formula for evaluating the values of the average current and the RMS current in the illustrated waveform in FIG. 6 is as follows:

$$I_{ave} = \frac{I_1 t_1 + I_2 t_2}{t_1 + t_2} \text{ and } I_{rms} = \sqrt{\frac{I_1^2 t_1 + I_2^2 t_2}{t_1 + t_2}}$$

where: I1 is the current value at the maximum current plateau;

t1 is the time during which the waveform is at the maximum current plateau;

I2 is the current value at the minimum current plateau; and t2 is the time during which the waveform is at the minimum current plateau.

Care must be taken in the choice of modulating frequency and wave shape so as to avoid the possibility of stimulating acoustic arc resonance effects. Thus, the choice of frequency, mark to space ratio and modulating frequency waveform may be dictated by the lamp type or other factors such as audible noise caused by the modulating frequency. In some cases it may be desirable to use modulation frequency waveforms other than square wave, such as sinusoidal, triangular or other waveforms so as to minimize the problems above whilst maximizing the overall colour change effect in the lamp. Care must also be taken to minimize the damage that may be caused to the lamps electrodes by excessive high peak arc currents.

The relationships of I1, t1, I2 and t2 varies as a function of specific lamps or by type of lamp. For example, the thermal time constant of the lamp may influence the relationships. Other values of I1, I2, t1 and t2 than shown in FIG. 6 may be used, such as having t1 longer or the same as t2 and/or the difference between I1 and I2 being greater or lesser. In one embodiment, the lamp current square wave operates within 50–200 Hz, the higher frequency modulation waveform (colour control waveform) operates within 500 Hz–2 kHz, and the ripple current is about 100 kHz. Other frequencies, frequency ranges and relative frequencies between these three waveforms may be used.

Figure 1:
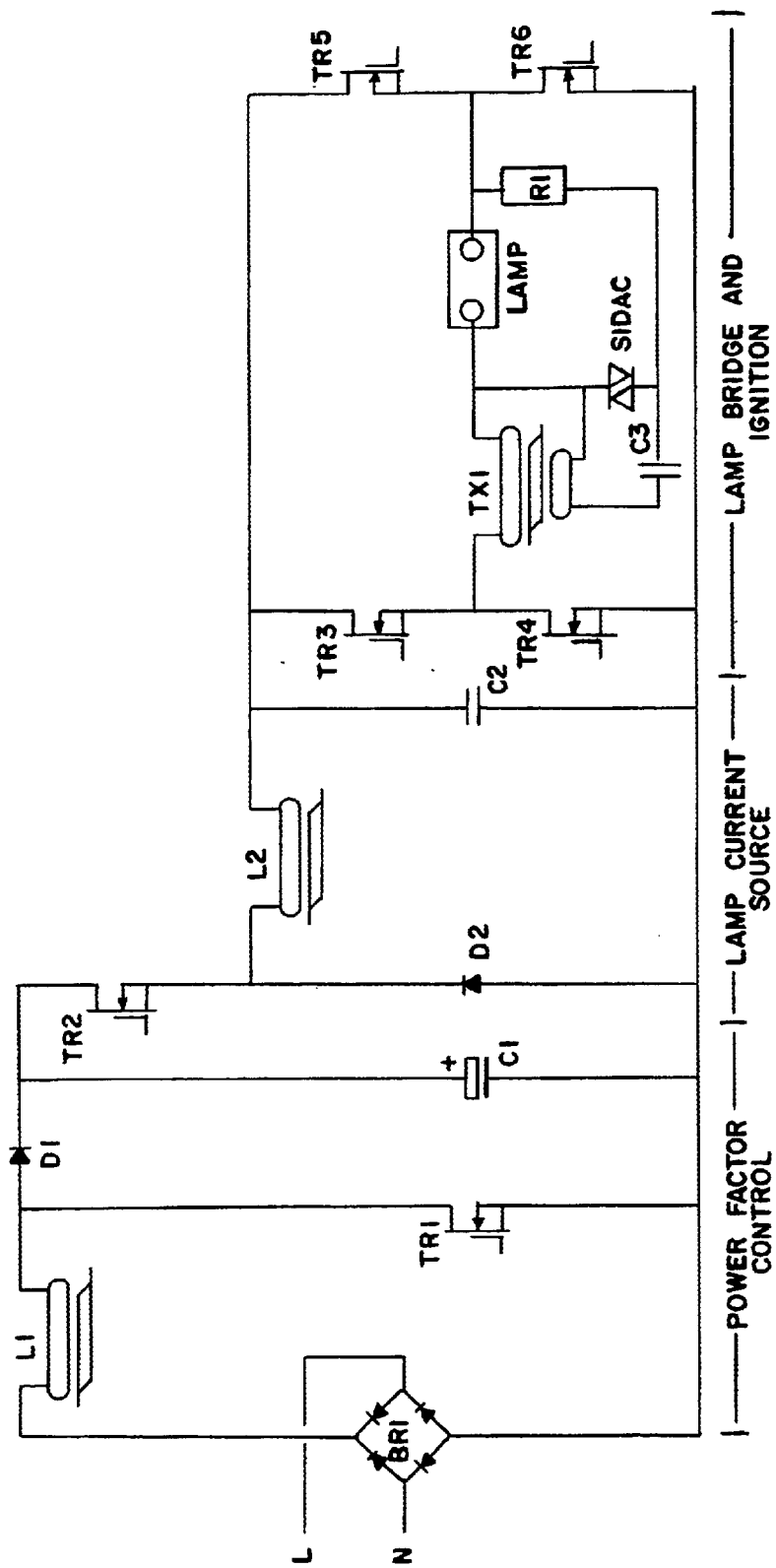
FIG. 1 illustrates a lamp ballast circuit according to the prior art.
Figure 2:
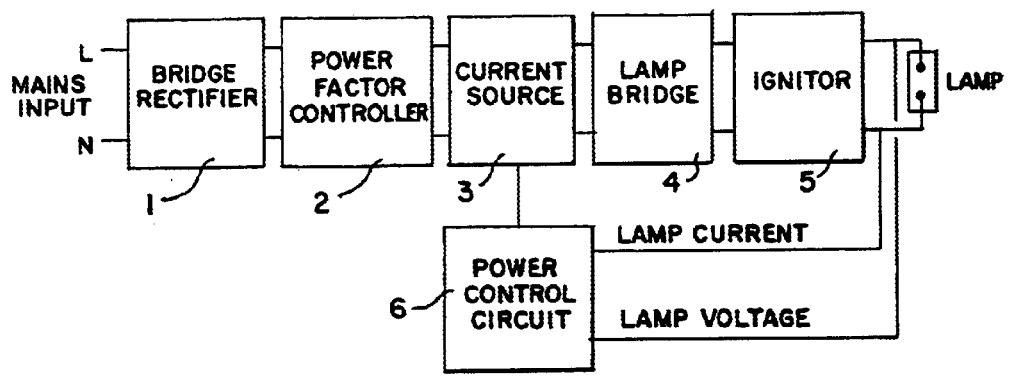
FIG. 2 illustrates a lamp ballast block diagram according to the prior art.
Figure 3:
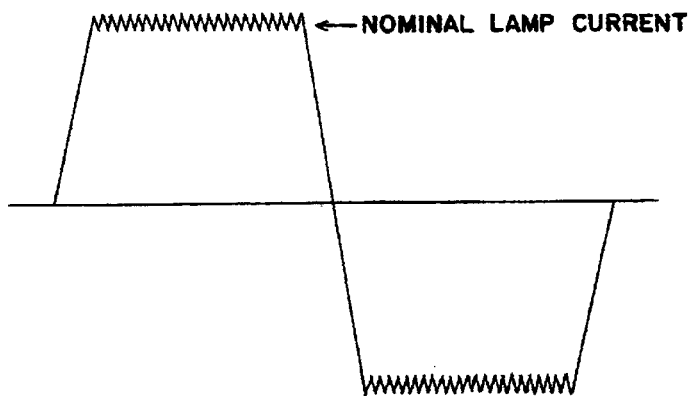
FIG. 3 illustrates schematically a typical lamp current waveform in accordance with the prior art with the lamp operating at nominal power (the rise and fall times of the waveform have been exaggerated for clarity)
Figure 4:
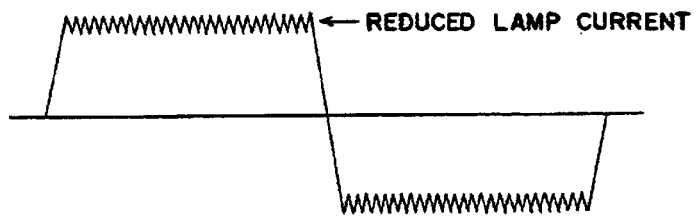
FIG. 4 illustrates a typical lamp current waveform in accordance with the prior art with the lamp operating at a dimmed or reduced power (the rise and fall times of the waveform have been exaggerated for clarity)

FIG. 5 shows the added lamp current modulator 7 for modulating the ratio of the I1 to I2 higher frequency current and controlling the t1 to t2 ratio. A typical ballasting circuit for HID lamps consists of a power factor controller circuit 2 which controls the power factor of the ballast presented to the mains input voltage. This power factor circuit 2 generates a DC voltage controlled bus to which a switch mode current source circuit 3 is connected. The current source circuit 3 controls the lamp current by means of a reference voltage signal (A) which is connected to one input of a comparator. The other input of the comparator is provided with a voltage proportional to lamp current signal (B). When the signal voltage (A) is less than the signal voltage (B), the comparator causes the current source transistor to turn on. The current source transistor is connected to an inductor as per FIG. 1 (prior art). The current in this inductor and therefore the lamp bridge and lamp increases at a rate dependent on lamp voltage, DC bus voltage and the inductance value of the inductor. When the lamp current and therefore the lamp current proportional voltage signal (B) exceeds the voltage of the reference voltage signal (A), the comparator causes the current source transistor to turn off. The current in the inductor is then commutated to the diode as shown in FIG. 1. The current reduces at a rate dependent on lamp voltage and inductance value until the lamp current proportional voltage signal (B) is below the voltage of the reference voltage signal (A) when the comparator again switches on the current source transistor. The comparator is provided with a fixed hysteresis such that the current is switched on and off between two preset values around the desired current value thus limiting the switching frequency of the current source transistor to a reasonable frequency (approx. 50–200 kHz).

The lamp current modulator 7 modulates the voltage of the reference voltage signal (A) so that the lamp current is similarly modulated in sympathy with the voltage of the reference voltage signal (A). A programmed microprocessor, application specific integrated circuit, transistors, switches, analog devices, digital devices or similar device now known or later developed is so programmed to drive a digital to analogue converter. The digital to analogue converter adds to or subtracts from the voltage of the reference voltage signal (A) to modulate the lamp current with the higher frequency square wave. In alternative embodiments, analog circuits or other devices for adding or subtracting from the voltage reference signal (A) are used.

Figure 7:
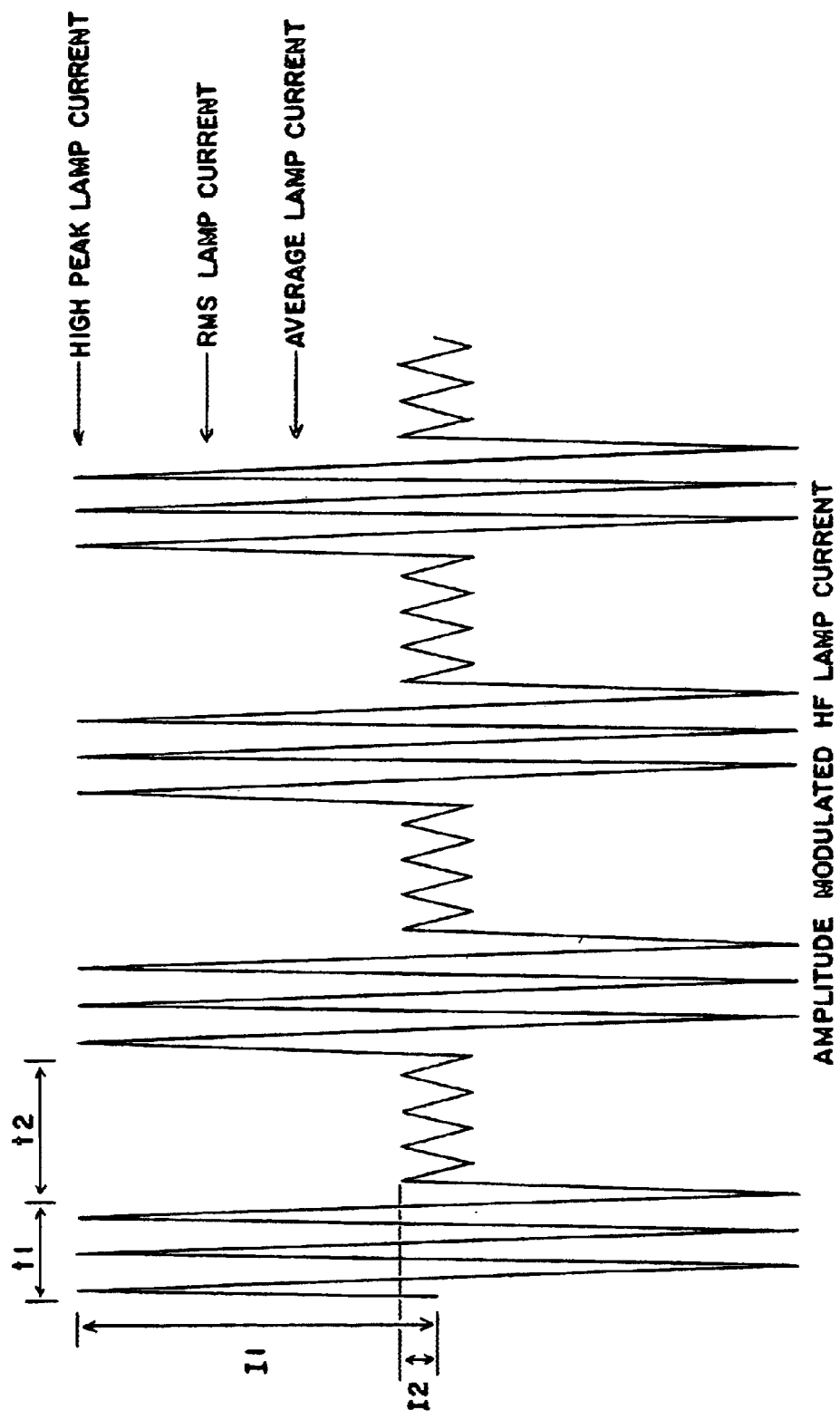
FIG. 7 illustrates a lamp current waveform produced by an electronic ballast operating at a high frequency with the lamp operating at a dimmed or reduced power.

In a further embodiment, HID lamps, such as metal halide lamps, are operated at high frequency (in the range 20 kHz to 2 MHz) from electronic ballasts at a reduced (dimmed) power. The frequency, amplitude and mark to space ratio of the lamp current modulation waveform is controlled such that as discussed above in reference to FIG. 6 and shown in FIG. 7 such that the average lamp current is lower than the RMS and peak lamp currents. The temperature of the arc tube and the contents thereof are maintained thereby, keeping the arc tube contents (dose) in a gaseous state and therefore improving the colour rendering of the lamp nearer to that which is expected of a lamp operating at nominal power.

The high frequency lamp current may be substantially triangular, sinusoidal, square or other in shape. The amplitude modulation of the high frequency lamp current may be effected by modulating the frequency of the waveform or by other means, such as hardware current limiting, altering the lamp series connected impedance or DC bus voltage in response to a signal generated by a software program in a microcontroller or by hardware signal generation.

While the invention has been described above by reference to various embodiments, it should be understood that many changes and modifications can be made without departing from the scope of the invention. It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A circuit for improving the light spectrum emitted from a dimmed high intensity discharge lamp by superimposing a high frequency waveform onto a lamp current derived from a high intensity discharge lamp ballast, the circuit comprising:

a current source operable to generate the lamp current;

a modulator operable to modulate the lamp current such that the frequency and mark to space ratio of the high frequency waveform are such that for each half cycle of a resultant lamp current waveform, the magnitude of an RMS lamp current is greater than the magnitude of an average lamp current such that a temperature of an arc tube of the dimmed high intensity discharge lamp increases.

2. The circuit according to claim 1 wherein the ratio of the RMS lamp current to the average lamp current is greater than 1 and less than 3.

3. The circuit according to claim 1 wherein the lamp current is a square wave.

4. The circuit according to claim 1 wherein the lamp current is a sinusoidal wave.

5. The circuit according to claim 1 wherein the lamp current is a triangular wave.

6. The circuit according to claim 1 wherein the high intensity discharge lamp comprises a metal halide lamp.

7. The circuit according to claim 1 wherein the current source via a lamp bridge is operable to generate the lamp current of at least 20 kHz.

8. The circuit according to claim 1 wherein the current source is operable to generate the lamp current at a first frequency of 50–200 Hz and the modulator is operable to generate the high frequency waveform at a second frequency of 500 Hz–2 kHz.

9. A method for improving the light spectrum emitted from a dimmed high intensity discharge lamp, the method comprising:

(a) superimposing a high frequency square waveform on a square wave lamp current derived from a high intensity discharge lamp ballast, characterized in that a frequency and mark to space ratio of the high frequency square waveform are such that for each half cycle of a resultant waveform, the magnitude of an RMS lamp current is greater than the magnitude of an average lamp current, a plurality of pulses of the high frequency square waveform being within at least one half cycle of the square wave lamp current;

(b) applying the resultant waveform to the lamp; and (c) operating the lamp at a dimmed power level for (a) and (b).

10. The method according to claim 9 wherein the ratio of the RMS lamp current to the average lamp current is greater than 1 and less than 3.

11. The method according to claim 9 wherein the lamp current is a square wave.

12. The method according to claim 9 wherein (a) comprises superimposing the high frequency square waveform at a first frequency of 500 Hz–2 kHz on the square wave lamp current at a second frequency of 50–200 Hz.

13. The method according to claim 9 wherein (a) comprises superimposing the high frequency square waveform such that a first time at a maximum current of the resultant waveform is shorter than a second time at a minimum current corresponding to the high frequency waveform.

14. The method according to claim 9 further comprising:

(d) superimposing a ripple waveform on the square wave lamp current, a frequency of the ripple waveform being greater than the frequency of the lamp current modulating high frequency square waveform.

15. The method according to claim 9 wherein (a) comprises superimposing the high frequency square waveform such that a first time at a maximum current of the resultant waveform is longer than a second time at a minimum current corresponding to the high frequency square waveform.

* * * * *

UNITED STATES PATENT AND TRADEMARK OFFICE
CERTIFICATE OF CORRECTION

| | | |
|---|---|---|
| PATENT NO. | : 6,791,285 B2 | Page 1 of 1 |
| APPLICATION NO. | : 10/292858 | |
| DATED | : September 14, 2004 | |
| INVENTOR(S) | : Simon Richard Greenwood et al. | |

It is certified that error appears in the above-identified patent and that said Letters Patent is hereby corrected as shown below:

On the Title Page, Item (57)

line 5, under "ABSTRACT", before "rating." delete "lower" and substitute --power-- in its place.

Signed and Sealed this

Twenty-second Day of August, 2006

JON W. DUDAS
*Director of the United States Patent and Trademark Office*